INVENTOR
JOHN D. NEGLEY
BY
ATTORNEYS

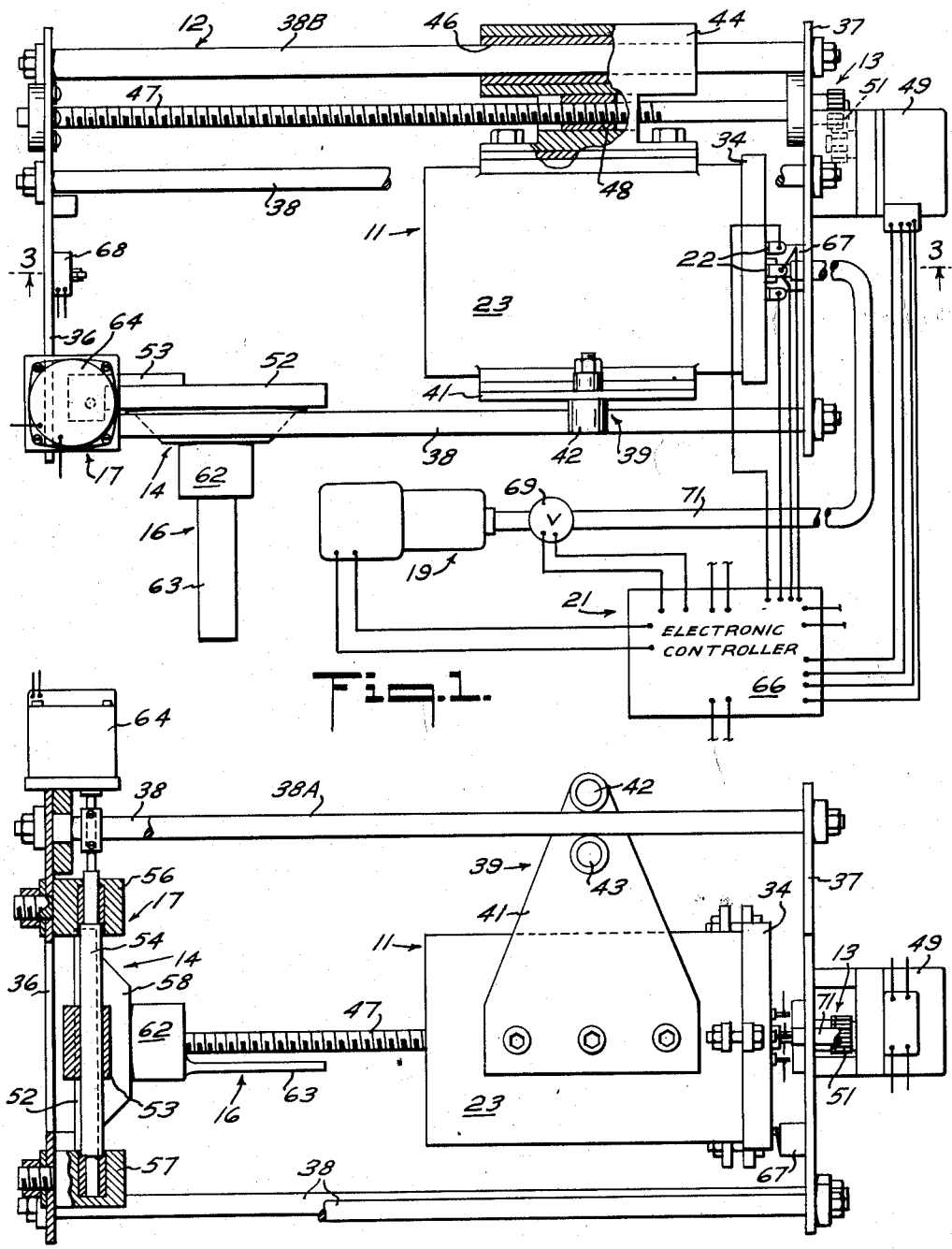

United States Patent Office 3,151,851
Patented Oct. 6, 1964

3,151,851
OVEN AND DOOR ARRANGEMENT
John D. Negley, 6396 Castro Valley Blvd.,
San Leandro, Calif.
Filed Oct. 16, 1961, Ser. No. 145,253
5 Claims. (Cl. 263—40)

This invention relates to firing ovens in general, and is particularly directed to an oven having particular utility in the automatic firing of dental appliances of ceramic or other fusible materials.

In the field of dental ceramics and the like it is necessary to fire various dental appliances of porcelain and other ceramic materials in an oven under very exacting conditions of temperature and pressure. Cycling of the temperatures and pressure in the oven has been heretofore accomplished in large part by hand adjustment of associated controls at times determined by the operator's observation of auxiliary timing and metering devices. Hence, during a firing cycle a dental ceramist is substantially confined to regulating the oven controls. Such restriction seriously detracts from a dental ceramist's available time during which other work might be accomplished.

It is therefore an object of the present invention to provide an oven for the firing of dental ceramics appliances and the like in a fully automatic manner.

Another object of the invention is the provision of an oven of the class described which is arranged for automatic control of oven temperature and pressure conditions through one or a succession of predetermined firing cycles.

Still another object of the invention is to provide an oven of the class described wherein the time required for cooling of the oven between successive cycles is materially minimized by an automatic door opening feature.

It is yet another object of the invention to provide an oven of the class described wherein the chamber or retort is translatable and automatically driven into and out of engagement with a door closure and appliance support which is fixed relative to the translational axis of the chamber, thus facilitating closing and opening of the oven.

A further object of the invention is to provide a fully automatic dental ceramics oven of relatively simple and economical construction so as to be of an attractive cost when compared to the man-hour savings which rapidly accrue from its use.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a top plan view of the oven with portions broken away and various subsidiary components illustrated in schematic, the oven door and support being in an open position to receive appliances.

FIGURE 2 is side elevation view of the oven with portions broken away and various subsidiary components illustrated in schematic, but with the oven door in a position to receive and engage the movable chamber.

Figure 3:
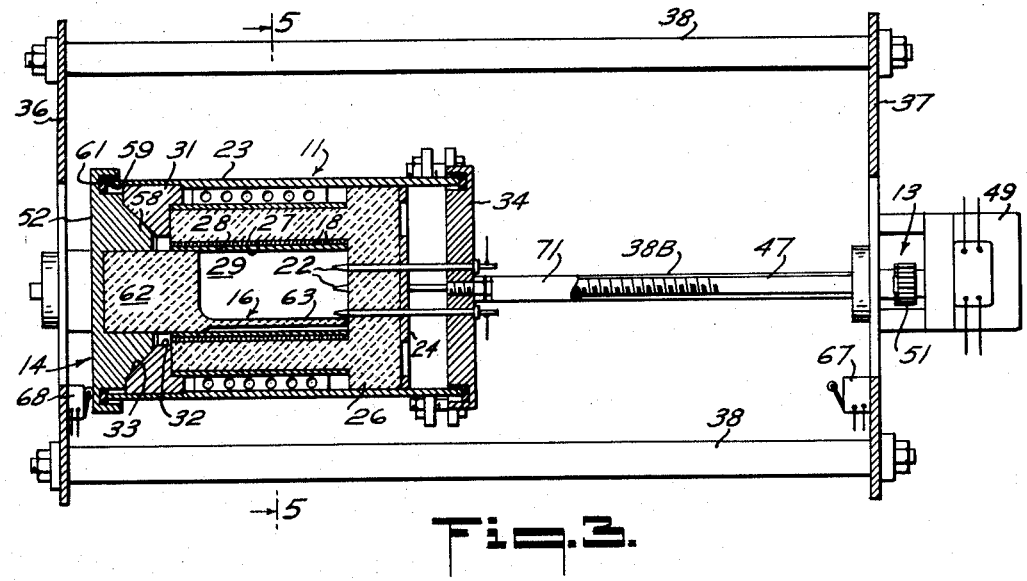
FIGURE 3 is a sectional view taken at line 3—3 of FIGURE 1, but with the door in closed engagement with the chamber.
Figure 4:
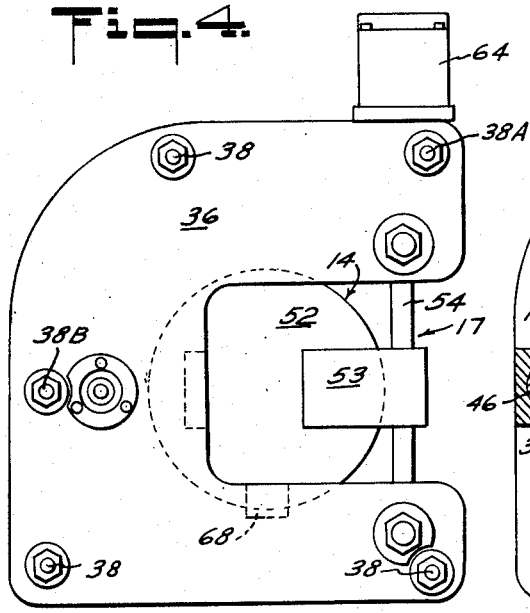
FIGURE 4 is an end elevation view of the oven at the door end thereof.
Figure 5:
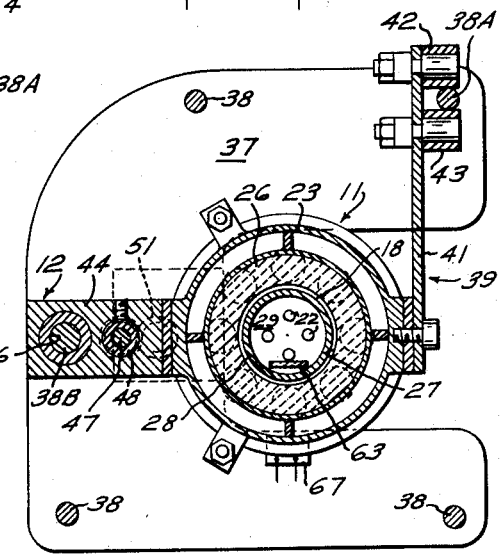
FIGURE 5 is a sectional view taken at line 5—5 of FIGURE 3.

Referring now to the drawings, the oven in its broader aspects will be seen to include a firing chamber or retort 11 with one end closed and the other open. The chamber is mounted upon a support frame 12 for translation longitudinally thereof. Drive means 13 are coupled to the chamber to selectively effect translation thereof into and out of sealed engagement with a door 14 which carries an appliance support tray 16 or equivalent means and is secured to the frame at a fixed longitudinal position. Preferably the door is mounted upon the frame for rotation about a vertical axis with pivoting means 17 coupled to the door for effecting rotation thereof in a predetermined correspondence to chamber translation.

The chamber 11 is equipped with heating elements 18 and is communicably coupled to a vacuum pump 19 or the like. Finally control means 21 of conventional design are operatively coupled to the heating elements 18, pump 19, drive means 13, and pivoting means 17 to control their operations in a predetermined related manner in response to the temperature within the chamber as sensed by temperature sensing devices such as thermocouples 22 provided therein. More particularly the control means 21 effects operation of the drive means to move the chamber into closed engagement with the door 14 when the chamber temperature reaches a predetermined starting point in a preset temperature cycle. In addition, the control means effects varied energization of the heating elements to regulate the chamber temperature in accordance with the preset cycle as well as to control operation of the pump and communication between the pump and chamber at predetermined points in the temperature cycle. At the end of the preset cycle the control means deenergizes the heating elements and actuates the drive means to move the chamber out of engagement with the door such that rapid cooling of the chamber is facilitated. The pivoting means may at this time be actuated by the control means to pivot the door and tray to a laterally facing readily accessible position. Thereafter, the control means may effect pivoting of the door to longitudinally facing position and translation of the chamber into sealed engagement therewith in response to the chamber temperature having fallen to the starting value of the same or another preset cycle which the control means determines. It will thus be appreciated that the control means may be preset to any desired firing cycle whereupon dental appliances placed on the tray are thereafter fired in accordance with the cycle in a fully automatic manner.

Considering now the oven in greater detail with regard to preferred structure, it will be noted that the firing chamber 11 includes an outer cylindrical shell 23 (see FIGURE 3). A partitioning disc 24 is secured within the shell and a cylindrical block 26 of refractory material or the like is concentrically secured therein in abutment with the disc. The block is provided with a central cylindrical recess 27 which receives an inner cylindrical shell 28. The inner shell and end of the block hence define a firing cell 29. In order that the cell be heated, the heating elements 18 are concentrically interposed between the inner shell and peripheral wall of the block recess 27.

The end of outer shell 23 corresponding to the open end of cell 29 is fitted with an insert block 31 which abuts the ends of refractory block 26 and inner shell 28. The block 31 has a central bore 32 communicating with the cell 29 and formed with an inwardly tapered seat 33 at its outer end for receiving the door 14. The outer end of the block 31 is preferably slightly inwardly spaced from the end of the shell 23.

The other end of the outer shell 23 is closed by means of a closure member 34 which is secured in sealed relation thereto and spaced from partitioning disc 24.

The support frame 12 upon which the chamber 11 is mounted preferably includes a pair of spaced apart substantially C-shaped end members 36, 37 secured together as by means of a plurality of tie rods 38. One tie rod 38A between the upper ends of members 36, 37 serves as a support rail for a wheeled truck assembly 39 secured to the chamber 11. More specifically the truck assembly includes a plate 41 secured to one side of the outer shell 23 of the chamber and extending upwardly beyond the upper periphery thereof. A pair of vertically spaced roller bearings 42, 43 are journalled at the upper end of the plate and project laterally outward therefrom, the upper bearing 42 rollably engaging the upper periphery of the rail 38A and the lower bearing 43 rollably engaging the lower periphery thereof.

Another of the tie rods 38B which extends between the medial regions of the webs of the end members 36, 37 also functions as a lateral guide rail for the chamber. In this regard a bearing block 44 projects laterally from chamber shell 23 on the opposite side thereof from that to which the truck assembly plate 41 is attached. The bearing block 44 is provided with a sleeved longitudinal bore 46 which concentrically slidably receives the guide rail 38B. The truck assembly 39 and bearing block 44 thus facilitate translational mounting of the chamber 11 longitudinally of the frame 12.

The drive means 13 for effecting controlled translation of the chamber longitudinally of the frame may advantageously comprise a worm gear 47 journalled between the support frame end members 36, 37 for rotation about a longitudinal axis. The worm gear is threadably received by a floating bushing 48 mounted within the bearing block 44. Thus as the worm gear is rotated, the chamber 11 is translated along the frame 12, the direction of translation depending upon the direction of rotation of the gear. Appropriately controlled rotation of the worm gear is preferably facilitated by a reversible servo drive motor 49 which is mounted upon one frame end member 37 and coupled to the worm gear 47 as by means of a drive gear train 51.

With the chamber 11 being thus arranged for controlled translation between the end members 36, 37 of the frame, closing and opening of the chamber firing cell 29 is effected by engagement and disengagement of the seat 33 with the door 14. More explicitly, the door 14 preferably includes a circular backing plate 52 pivotally mounted for translation about a vertical axis upon the frame end member 36 which faces the open end of the firing cell. To this end a tongue 53 projects radially from the backing plate 52 and is secured to a vertical shaft 54. The shaft is journalled between bearing blocks 56, 57 which respectively project longitudinally inward from the ends of the parallel upper and lower leg portions of the end member 36. The door backing plate 52 may thus be pivoted upon the shaft between a position in coaxial relation to the chamber 11 and a position facing laterally outward from the frame. In order that the door be sealingly engageable with the chamber when the door backing plate is in coaxial position, the backing plate is formed with a longitudinally projecting tapered boss or plug 58 which is adapted to engage the seat 33. In addition, an annular groove 59 is preferably formed in the face of the door backing plate with a resilient sealing element 61 disposed therein, the groove being adapted to receive the end of the chamber outer shell 23. Finally, the door includes the appliance support tray 16 of previous mention. The tray preferably is formed of refractory material and includes a support block portion 62 embedded in, and projecting from the plug 58 for engagement with the open end of chamber inner shell 28. The tray proper 63 then projects longitudinally from the lower extremity of the block portion 62 a distance substantially equal to the length of the inner shell. Thus when the door is positioned coaxial with the chamber axis, vacuum sealed closure of the firing cell is effected upon translation of the chamber towards the door to a position wherein the seat 33 is engaged by the plug, the groove 59 is engaged by the end of outer shell 23, and the support block portion 62 of the tray engages the inner shell 28. The tray proper 63 is at this time disposed within the firing cell and appliances supported on the tray may be subjected to a firing cycle. Upon translation of the chamber away from the door, the cell is opened and cooling progresses rapidly. The door may then be pivoted to its laterally facing position whereby the tray and appliances thereon are readily accessible.

As regards the pivoting means 17 coupled to the door 14 for effecting controlled movement thereof between the foregoing positions, it will be noted that such means preferably comprises a reversible servo motor 64 mounted upon frame end member 36 and coupled to the shaft 54. Upon suitable energization of the motor 64 in a a manner subsequently described, the shaft, and therefore the door secured thereto, are rotated between positions wherein the door is coaxial with the chamber axis and laterally facing therefrom.

Considering now the control means 21, it will be noted that same includes an electronic controller 66, the input of which is coupled to the thermocouples 22, or equivalent means, which are disposed within the cell 29. A limit switch 67 mounted upon end plate 37 so as to be engageable with the chamber 11 and a limit switch 68 mounted upon end plate 36 so as to be engageable with the door when in its coaxial position are likewise coupled to the input of controller 66. The output of the controller is coupled in energizing relation to heating elements 18 and servo motors 49 and 64. Similarly, the output of the controller is coupled in energizing relation to the pump 19 and a solenoid actuated valve 69 which is in the vacuum line 71 between the pump and the firing cell 29. The specific details of the controller 66 are not illustrated nor described in detail herein, such controller being of a conventional design for effecting a given sequence of operations as described hereinafter.

With the door 14 in laterally facing open position and the chamber 11 withdrawn to the end plate 37 and in engagement with limit switch 67 (see FIGURE 1), dental appliances to be fired are placed upon the tray. Presetable timers and temperature regulating devices within the controller 66 may then be set for a predetermined sequence of firing temperatures. In addition, a vacuum selector switch on the controller may be operated to select predetermined vacuum-on and vacuum-off positions in the firing cycle. Now the start switch of the controller may be actuated to effect energization of the heating elements. The controller is preferably arranged such that when the first temperature in the selected firing cycle is attained in the cell 29 as sensed by the thermocouples 22, power is applied to the servo motors 64 and 49 to effect pivoting of the door to its coaxial position and translation of the chamber toward the door. When the door is coaxially positioned the limit switch 68 is engaged to cut off servo motor 64. The servo motor 49 is arranged to undergo a predetermined number of revolutions commensurate with translation of the chamber to a position wherein it engages the door to seal the firing cell in the manner previously described. The motor 49 is at this time deenergized and one of the timers of the controller actuated. The various timers and temperature regulating devices of the controller in conjunction with temperature sensing signals applied thereto by the thermocouples 22, then control the temperature within the firing cell 29 through the preset firing cycle. At the predetermined point in the cycle the controller effects actuation of the pump 19 and valve 69 to establish a vacuum in the firing cell. At the predetermined vacuum-off point in the cycle the controller effects deenergization of the pump and valve to vent the cell to atmosphere. Finally, after the last temperature of the firing cycle has been timed out by the controller, the power is removed from the heating elements 18 and power is applied to servo motor 49 to effect translation thereof out of engagement with the door. After a predetermined time sufficient for the motor to translate the chamber clear of the tray, the controller effects energization of the servo motor 64 to pivot the door to its laterally facing position. The motor 49 is deenergized upon the chamber engaging the limit switch 67. The energization of motor 64 is appropriately timed to just rotate the door 90° to its laterally facing position whereupon the motor is deenergized. The tray of appliances is thus readily accessible to the operator and, moreover, the cell being open rapidly cools preparatory to a subsequent firing cycle.

The foregoing sequence of operations is to be taken as merely exemplary, it being appreciated that other sequences, or successions of sequences, might as well be employed depending upon the particular design and complexity of the controller.

What is claimed is:

1. An oven comprising support means, a door pivotally mounted upon said support means for movement between longitudinally and laterally facing positions, a firing chamber mounted for translation longitudinally of said support means and having an open end engageable with said door, drive means coupled to said chamber for selectively effecting said translation, and pivot means coupled to said door for effecting said movement thereof in predetermined correspondence to translation of said chamber.

2. An oven comprising support means, a door pivotally mounted upon said support means for movement about a generally vertical axis between longitudinally and laterally facing positions, a firing chamber mounted for translation longitudinally of said support means and having an open end engageable with said door, a motor coupled in driving relation to said chamber for effecting said translation, and a second motor coupled in driving relation to said door for effecting said movement thereof.

3. An oven comprising a support frame, a door pivotally mounted upon said support frame for movement about a vertical axis between longitudinally and laterally facing positions, a support tray projecting from said door, a firing chamber mounted upon said support frame for translation longitudinally thereof and having an open end for receiving said tray and sealingly engageable with said door, heating elements carried by said chamber for heating same upon energization, temperature sensing means carried by said chamber for sensing the temperature therein, drive means including a motor coupled to said chamber for effecting said translation thereof in response to energization of the motor, and a second motor coupled to said door for effecting said movement thereof in response to energization of the second motor.

4. An oven according to claim 3, further defined by said drive means including a worm gear journalled upon said frame for rotation about a longitudinal axis, said worm gear coupled in driven relation to said first motor, and means secured to said chamber for threadably receiving said worm gear.

5. An oven according to claim 3, further defined by a vacuum pump communicably coupled to the interior of said chamber, and a valve between said pump and chamber.

References Cited in the file of this patent

UNITED STATES PATENTS

| | | |
|---|---|---|
| 2,092,781 | Schantz | Sept. 14, 1937 |
| 2,163,510 | Cantrell et al. | June 20, 1939 |
| 2,346,973 | Kuster et al. | Apr. 18, 1944 |
| 3,020,032 | Casey | Feb. 6, 1962 |

FOREIGN PATENTS

| | | |
|---|---|---|
| 486,664 | Great Britain | June 8, 1938 |